Feb. 2, 1971            H. H. LOEFFLER            3,560,377

APPARATUS AND PROCESS FOR FILTERING FLUIDS

Filed Jan. 21, 1969            2 Sheets-Sheet 1

HERBERT H. LOEFFLER
INVENTOR.

BY Andrew F. Kehoe

ATTORNEY.

Feb. 2, 1971   H. H. LOEFFLER   3,560,377
APPARATUS AND PROCESS FOR FILTERING FLUIDS
Filed Jan. 21, 1969   2 Sheets-Sheet 2

HERBERT H. LOEFFLER
INVENTOR.

BY Andrew F. Kehoe

ATTORNEY.

United States Patent Office 3,560,377
Patented Feb. 2, 1971

3,560,377
APPARATUS AND PROCESS FOR FILTERING FLUIDS
Herbert H. Loeffler, Arlington, Mass., assignor to Amicon Corporation, Lexington, Mass.
Filed Jan. 21, 1969, Ser. No. 792,636
Int. Cl. B01d 13/00
U.S. Cl. 210—23          18 Claims

ABSTRACT OF THE DISCLOSURE

Novel apparatus for processing of fluids under pressure and comprising a stack of novel disc-like processing units suitable for supporting filters, membranes, or other surfaces with which intimate contact is desired wherein said processing units are advantageously nested together. Processing units also comprise integral flow-directing means and fluid-collecting means and may be arranged by suitable plugging of conduits to provide a variety of flow configurations throughout the apparatus. The novel processing units are also subject of the instant invention as is the process whereby liquid processing may be carried out, e.g. in such apparatus, without short-circuiting of the liquid streams while avoiding excessive leakage.

BACKGROUND OF THE INVENTION

It is often desirable to process fluids continuously through apparatus at elevated pressures. When such operations are to be carried out, it becomes a problem to (1) assure that the processing apparatus does not develop external leakage and (2) assure that the internal flow paths of the liquid being processed do not become short-circuited in such a way as to allow the feed stream to become mixed with the stream which has already been processed. It is, of course, highly desirable to achieve these ends with the least cumbersome apparatus available. Generally, the apparatus should be easily cleanable, as compact as possible, and as light in weight as possible. Most of these factors are particularly important when the fluid being processed is likely to be of high economic value such as the liquids normally subjected to ultrafiltration.

Ultrafiltration is a chemical processing operation that has only recently become useful as a practical operating method for a large number of applications. The single most important step in achieving practical ultrafiltration rates was the development of a family of anisotropic microporous membranes which exhibit very high flow rates, effective pore sizes of from about 10 angstroms to 500 millimicrons at operating pressures of 50 p.s.i.g., and good resistance to plugging. This latter phenomena is believed to be largely assignable to a very thin barrier layer on the upstream side of the membrane which allows the membrane to perform as a surface-type rather than a depth-type filter. Such ultrafiltration membranes as described herein are commercially available under the trade designation Diaflo from Amicon Corporation of Lexington, Mass.

Up until the present time, it has been conventional to use such membranes in well-stirred batch cells, i.e. cells wherein the solution to be ultrafiltered is constantly stirred by an agitating device riding just above the membrane surface. Such well-stirred batch cells are entirely satisfactory for concentration or fractionation of many solutions on a laboratory-batch scale. However, two fundamental aspects of ultrafiltration processing work directly against the use of such cells for continuous, high-flow rate, operations:

(1) Macromolecules have relatively low diffusion rates and thereby tend to concentrate at the filtering face of the membrane, where the agitation is relatively ineffective, rather than back diffuse into the body of solution being ultrafiltered.

(2) The relatively high flow rates possible through pore-flow ultrafiltration membranes tend to promote the concentration of macromolecules still further, i.e. to accentuate the movement of molecules to the surface of the membrane and, at the same time, to slow further back diffusion from the membrane surface.

These two effects combine to form a so-called concentration polarization effect of the macromolecular solute at the membrane surface. This effect is at its worst when the solute reaches such a concentration that it forms a gel-type film; such a film usually effectively stops the operation of the hydraulically-moderated ultrafiltration process and can slow the membrane throughput to virtually that obtainable with diffusion-type membranes, e.g. those ultra-tight membranes used in saline water purification. Moreover, this gel can effectively block the passages in the membrane barrier skin which passages determine the effective pore size of the membrane. When this occurs, some molecules which are desirably passed through the membrane will be retained on the upstream side thereof.

Thus it remains a problem to provide apparatus in which modern ultrafiltration membranes can be used to carry out ultrafiltrations at rates more acceptable in commercial operations than has heretofore been possible.

SUMMARY OF THE INVENTION

It is an object of the invention to provide improved apparatus for carrying out processing of fluids under pressure.

It is a particular object of the invention to provide ultrafiltration apparatus which will provide improved flow rates and allow such flow rates to be sustained over long periods of time.

Another object of the invention is to provide ultrafiltration apparatus which may be operated under moderately high pressures without leakage.

Another object of the invention is to provide fluid processing apparatus which is highly versatile in that it may be readily converted to handle a large variety of flow configurations, both parallel and in series and, in fact, to handle a combination of such configurations simultaneously.

A further object of the invention is to provide a versatile construction whereby the quantity of useful membrane surface area and, consequently, the output of apparatus, can be varied at will.

It is also an object of the invention to provide a novel ultrafiltration process.

Another object of the invention is to construct a relatively light portable apparatus suitable for continuous ultrafiltration.

A further object of the invention is to provide leak-proof processing apparatus which may be assembled and disassembled a great many times by a person of minimal training and with minimal tools, without damaging the seal means.

Other objects of the invention will be obvious to those skilled in the art on reading the instant specification.

The above objects have been substantially accomplished by the construction and utilization of apparatus comprising a plurality of disc-shaped, or plate-like, processing units which are advantageously nested one to another and which, in their most advantageous configuration, comprise flow directing means integral therewith to optimize the flow pattern within the apparatus of a particular liquid to be processed. These plate units also may comprise internal conduits when required and this feature, together with the integral flow-directing means and nesting features, allow construction of an extremely compact processing unit. Moreover the flow paths between stacked plates are advantageously constructed to provide a so-called "thin-channel" flow configuration particularly useful in ultrafiltration. Incorporation of such thin channels in such apparatus is a consequence of the discovery that, under certain feed liquid flow conditions, macromolecular ultrafiltration can be improved by use of very thin channels in which flow is laminar to reduce pressure drop yet rapid enough to provide good shearing action close to the membrane surface. This is despite the fact that the theoretical factors (such as relatively high diffusivity of salt ions) on which the advantages of thin-channel processing were predicated do not exist in most ultrafiltration work because of (1) the low diffusion coefficients of macromolecules and of (2) the tendency of many such molecules to form gels which, in effect, prevent back diffusion of the molecules away from the membrane.

A particular problem encountered in using such plate-type construction of pressure vessels has been the tendency of the outermost plates to deflect under desirable operating pressures, thereby allowing leakage of liquid from the apparatus or, worse, leakage within the apparatus between different fluid streams. This problem, however, has been effectively avoided by utilizing a pressure-equalizing means whereby top and bottom plate-like processing units are subjected to a pressure equilibrium by utilization of a hydrostatic zone between these plates and protective cover plates adjacent thereto. This pressure is advantageously achieved by connecting the fluid passages on the outer sides of each of the top and bottom processing uints to a dead-ended process stream, thereby providing a pressure-equalizing means which is effective to avoid deflection of either of these processing units. Of course the protective cover plates are usually advantageous at either end of the stack; but, now, these may be sufficiently thin to allow some deflection thereof because such deflection will not result in any important leakage or short-circuiting of the feed stream into the ultrafiltrate stream. Thus, use of relatively thin cover plates—which are advantageously metallic—greatly reduces the weight of the apparatus. Moreover the fact that the processing unit plates are subject to approximately equal pressures on each side thereof means that these plates too may be relatively-thin and constructed of relatively low modulus, and light materials such as polymeric resins, e.g. the polyformal sold under the trade designation Delrin by E. I. Du Pont de Nemours and Co., Inc. and other such materials known to those skilled in the art. Use of such polymers, of course, allows still further reductions in the size and weight of the apparatus and also major reductions in the cost of fabricating the plates.

Another advantageous feature of the invention is the use of vertical conduits in the various elements of the stack which conduits, when brought into register with one another, provide a manifold whereby fluid streams from (or to) the various processing elements may be joined. When it is desirable to divide the stack into a number of parallel systems, each comprised of at least one plate-like process unit (which in a typical case would comprise the usage of a single process zone between the bottom of one process unit and the top of an adjacent unit), the manifold-forming conduits can be plugged as is necessary to obtain the desired flow paths.

The aforementioned nesting feature is particularly desirable when thin channel ultrafiltration is to be carried out, not only because it provides good radial registration of various O-ring seal means, but also because it allows a positive setting of the thin channel flow-path dimensions between each plate, substantially independent of the stack-tightening procedure.

Although the greatest advantage of the invention is realized when it is operated at higher pressures, e.g. 5 to 200 p.s.i.g., it should also be noted that the apparatus is suitable for operation under vacuum, for example in operations wherein the process feed stream is at about atmospheric pressure and the stream of processed fluid, e.g. ultrafiltrate, is at negative pressure.

ILLUSTRATIVE EXAMPLE OF THE INVENTION

Figure 1:
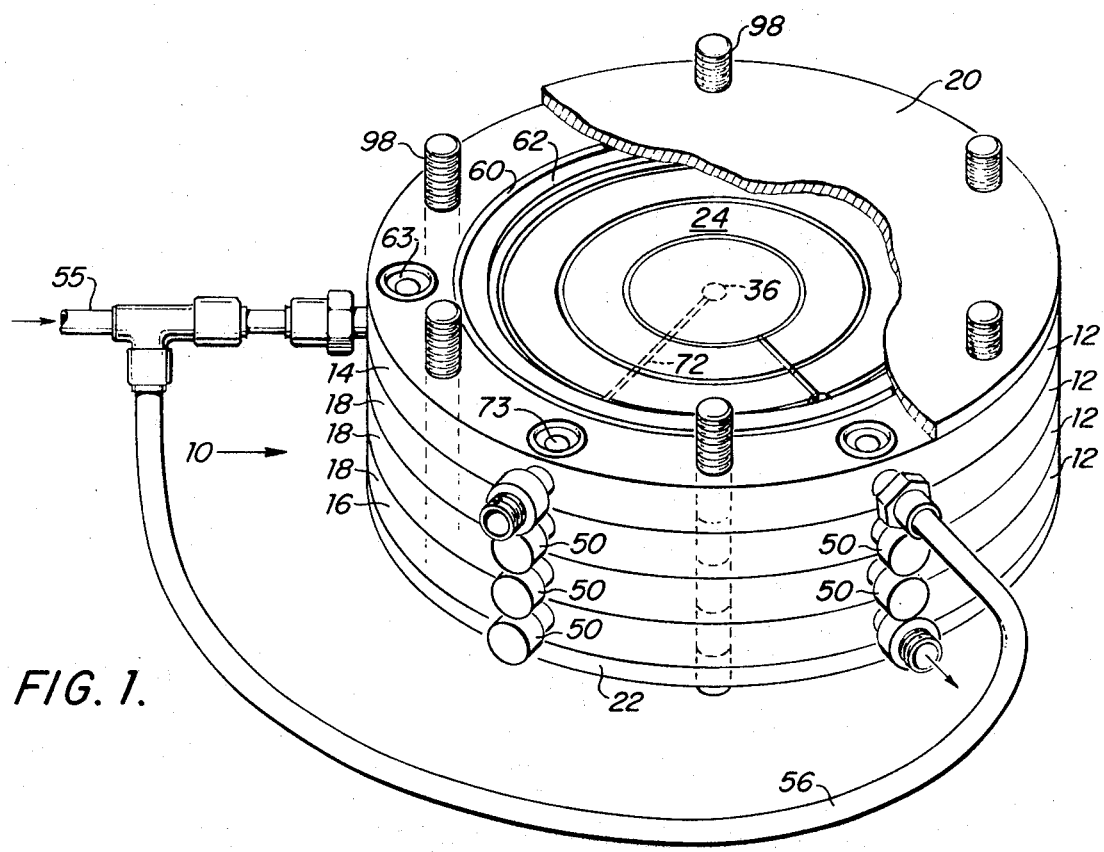
FIG. 1 is a perspective view of an ultrafiltration apparatus according to the invention with the top cover plate partially shown.

Referring to the drawings, it is seen that a stack 10 is formed of a plurality of disc-shaped, plate-like processing units 12 including a topmost plate element 14, a bottommost plate element 16, intermediate plate element 18, and a top cover plate 20 and a bottom cover plate 22.

Figure 5:
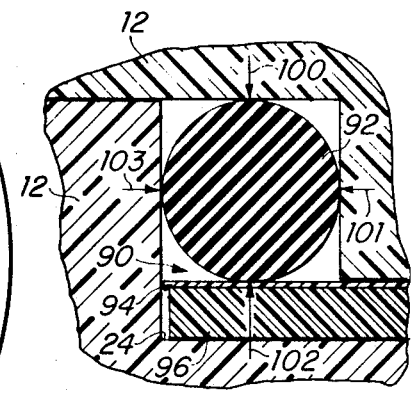
FIG. 5 is a view, in section, showing detail of a seal between the plate-like processing units and means by which a membrane is held on the surface of the filter.

Each said processing unit 12 comprises a recessed top support surface 24 suitable for supporting a membrane as seen in FIG. 5 and/or other porous processing elements (not shown in FIG. 3 in order to promote clarity of the drawings) and a projecting bottom surface 28. In a given stack, the surface 24 of a lower processing unit 18 or 16 complements projecting surface 28 of an adjacent upper processing unit 18 or 14 to form nesting means whereby the processing units are radially centered over one another.

A membrane (not shown in FIG. 3 but resting on surface 24), in the illustrative case, forms a semipermeable barrier between the fluid inlet side 29 of processing units 12 and the fluid outlet side 31 thereof.

Figure 4:
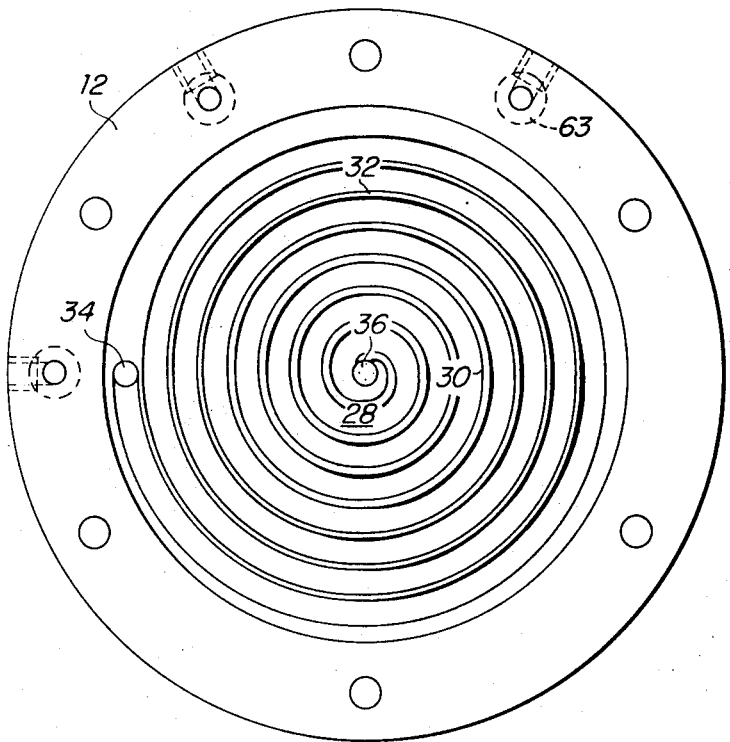
FIG. 4 is a view, from the bottom, of the element shown in FIG. 2.

The process units 12 have flow-directing means 30 on the projecting bottom surface 28 thereof. This means 30 is not shown in FIG. 3 but, as best seen on FIG. 4, comprises a shallow spiral path 32, suitably about 0.56 inch wide and 0.010 inch deep which starts at a port 34 and terminates at a centrally-located exit port 36. When pressed down on a membrane surface, this path in conjunction with the membrane surface, forms a suitable thin channel for ultrafiltration of macromolecular solutions.

Figure 2:
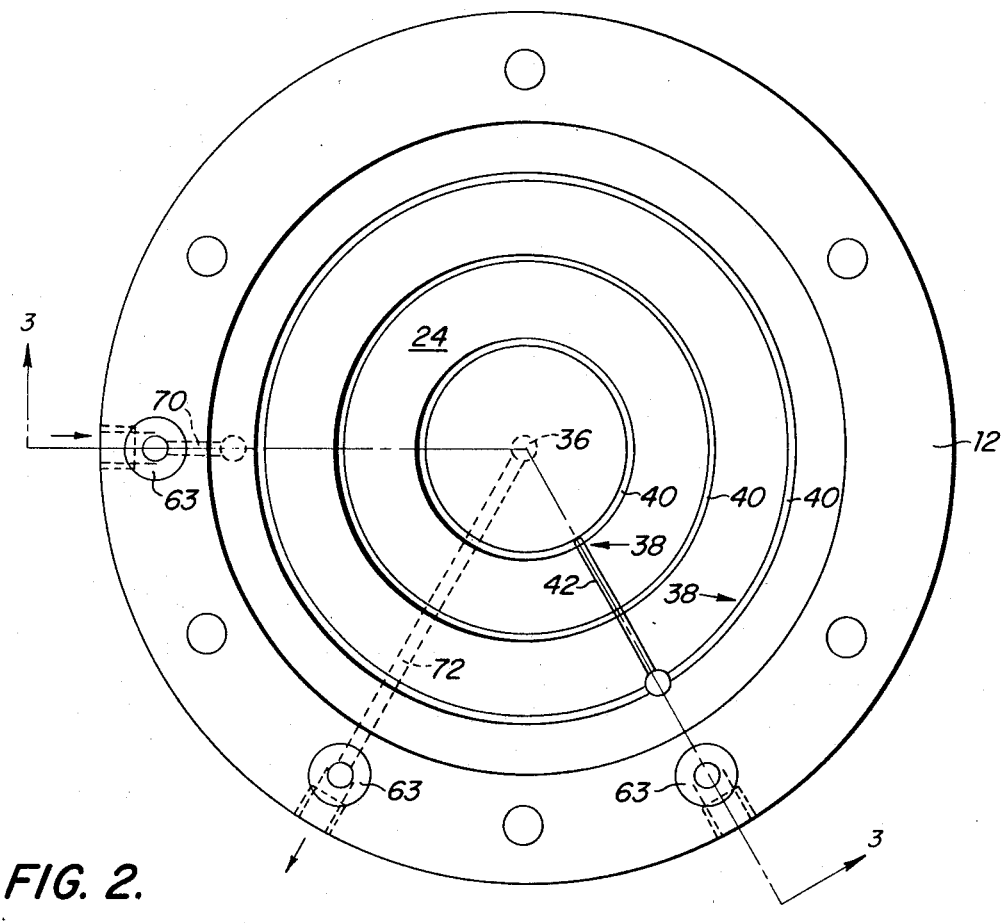
FIG. 2 is a plan view of one of the plate elements of which the apparatus is principally constructed showing the structure which determines the liquid flow paths associated with each plate.

As best seen in FIG. 2, process units 12 have a fluid conduit system 38 on recessed support surface 24. System 38 comprises concentric collecting grooves 40 and a radial collecting groove 42 which intersects all grooves 40. This fluid conduit system 38 forms means to facilitate the removal of ultrafiltrate liquid from surface 24. Were it not for such a system, the membrane (or its porous support) would be pressed flat against surface 24 and the flow rate therethrough would be substantially diminished. Thus system 38 forms means to facilitate collection of fluid arriving at and leaving the downstream side of the membrane.

Figure 3:
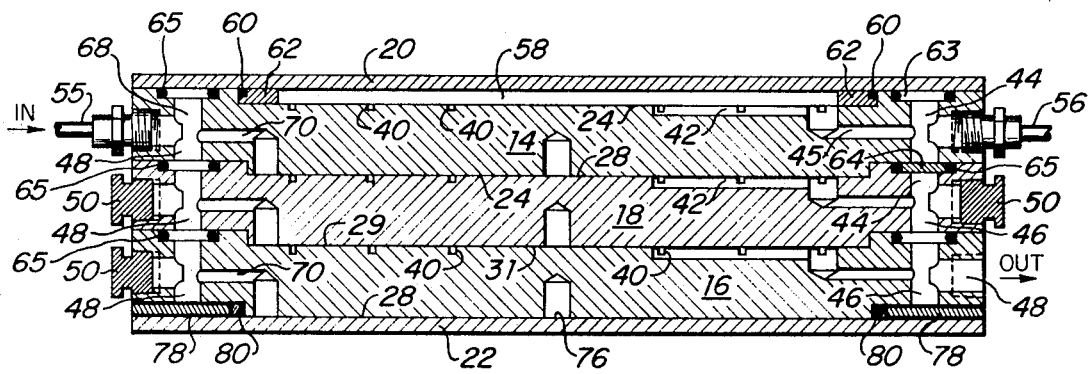
FIG. 3 is, substantially, a section of a short stack comprising three plate elements taken along the line 3:3 shown in FIG. 2.

Now referring to FIGS. 1 and 3, it is seen that conduit system 38 is, in the intermediate plate element 18, in communication with a vertical manifold conduit 44 via lateral conduit 45 which is drilled through processing unit 18. Manifold conduit 44 is formed of vertical conduits 46 of the intermediate plate element 18 and bottommost plate element 16. An outlet port 48 is available so that fluid leaving any plate through lateral conduit 45 may be removed directly from the apparatus. Normally, however, manifold conduit 44 is utilized to channel the fluid leaving the downstream side of several processing units into a common outlet. This is achieved by utilizing plugs 50 to plug outlet ports 49.

As has been indicated above, a particular advantage of the invention is the means whereby the disc-like processing units 12 may be pressure-equilibrated and thereby constructed of low-modulus materials such as the polymeric resins having broad resistance to chemical attack. Such plastic construction is also necessary to make stacks containing over four or six processing units easily portable about a laboratory. Referring to FIGS. 1 and 3, it is seen that a process feed inlet conduit 55 not only introduces feed into an intermediate plate element 18 but also has an auxiliary conduit 56 which introduces process feed into a hydrostatic pressure zone 58 between cover plate 20 and adjacent topmost plate element 14. A seal is maintained between cover plate 20, normally of stainless steel or some other such high-modulus material of construction, and topmost plate element 14 by use of an O-ring seal 60 held in place by a retaining ring 62. This arrangement provides that a substantially equal pressure is preserved in the hydrostatic pressure zone and the remote side of the adjacent topmost plate element 14.

Cross-flow between (1) process feed carried through auxiliary conduit 56, into topmost plate element 14 and thereby into hydrostatic zone 58 through conduit 45 thereof and (2) vertical manifold conduit 44 of the ultrafiltration-collection system is avoided by placing a small disc-like plug 64 in enlarged section 63 of the vertical conduit 46 in the uppermost of intermediate plate elements 18. This plug is normally set within a small O-ring seal 65 which is utilized in all said sections 63 throughout the unit as an effective sealing means between the various plate elements.

Process feed liquid is admitted through conduit 54 into a vertical manifold 68 which, like the ultrafiltrate manifold 44, also is comprised of vertical conduit sections 48 in each processing unit. Thence, the feed stream proceeds through a conduit 70 cut into each processing unit and thereby proceeds through port 34 (see FIG. 4) of the processing unit. The path of the feed stream is then controlled by spiral path 32 of flow-directing means 30. During flow along this path, there is a certain loss of material (i.e. ultrafiltrate) through the adjacent membrane. The remaining fluid proceeds through centrally-located exit port 36 and thence through an internal recycle conduit 72. Conduits 72 empty into a similar manifold system as does lateral conduit 45 of the ultrafiltrate collection system. The number of actual outlets is dependent upon the number of plugs 50 which are used. It is, of course, possible to use only a single outlet from a manifold 73 formed by vertical conduits or it is possible to have feed recycled from each processing unit.

It has been seen above that topmost plate element 14 is only partly utilized because the hydrostatic zone 58 is approximately at the same pressure as the pressure exerted on the bottom of the plate, i.e. the feed-stream supply pressure. The topmost plate element 14, therefore, is used only as a process feed inlet means and as flow-directing means to achieve the desired flow path, e.g. the illustrated spiral flow path, over the next lower processing unit.

A similar arrangement is desirable at the bottommost plate element 16. So far as operation on recessed support surface 24 of bottommost plate element 16 is concerned, it is not different from the operation on surface 24 of any of the intermediate plate elements 18. However, the process feed stream entering through conduit 70 is held in a second hydrostatic pressure zone 76 formed by the fluid volume associated with flow-directing means 30 and conduit 72. A retaining ring 78 and O-ring seal means 80 aid in sealing bottommost plate element 16 to bottom cover plate 22.

Referring to FIG. 5, it is seen that, at the position where two processing units 12 meet, there is a sealing means 90 consisting of an O-ring 92. Also seen in FIG. 5 is a membrane 94 resting on a porous support plate 96 and the recessed support surface 24 of the upper processing unit 12. Because the outer peripheral portions of the adjacent plate elements 12, as seen in the upper left hand portion of FIG. 5, are in face to face contact with each other outside the periphery of membrane 94, the extent to which O-ring 92 and membrane 94 can be compressed is fixed by the depth of the recessed surface 24, ensuring uniform sealing of all plate elements when the stack is clamped.

O-ring 92 forms means to assure that the membrane is held down snugly at its perimeter. The vertical clamping pressure conventionally exerted on stack 10 by nuts screwed ont bolts 98 (see FIG. 1) provides means for compressing the O-ring seal to make it effective. Moreover, the two processing units 12 are so sized that there is a lateral compression of O-ring 92 even before such vertical compression is exerted. Thus, in operation, the O-ring 92 is effective to seal at each of contact points 100, 101, 102 and 103 shown in FIG. 5.

It will be seen that the particular flow-directing means illustrated with the above apparatus assures a substantially constant velocity across the membrane surface. This assumes that there is no substantial change in the flow properties of the liquid as ultrafiltrate is removed therefrom. Where there is such a change, the geometry of the flow-directing means may be gradually modified to accommodate the change. Moreover, although the illustrated embodiment shows a single inlet source and single inlet manifold systems for the feed and ultrafiltrate streams, it is possible to have a plurality of such streams if the rheology of the liquids so demand. Thus, although a single long flow path is illustrated, four shorter flow paths across the membrane surface may be more beneficial. Moreover, these shorter flow paths may emanate from one or a plurality of fluid inlets. Thus, it is seen that what can be done in a gross way by arranging processing units to accommodate flow paths of different lengths—in series or parallel—throughout a stack, may also be done for each processing unit, by changing the configuration of a flow-directing means which controls a flow path over a given processing unit.

It will also be obvious to those skilled in the art that, while the use of metallic cover plates in foreseen in the embodiments of the invention meant to operate at higher pressures, the use of such cover plates is not mandatory at very low operating pressures. Indeed, with the appropriate outlets plugged, processing elements such as those used to form the body of the stack could be used as cover plates.

It will be understood that many other modifications and variations of the invention may be made and that, in view of the foregoing specification, those skilled in the art will be able to modify the apparatus of the invention to meet their various requirements and otherwise adapt the apparatus to their particular situation. For example, while the plate-like processing units described above have fluid collecting means and flow-directing means opposite sides of each plate, it is to be understood that a stack of processing units could readily comprise alternating units of the types having (1) a flow-directing means on each surface thereof and (2) a fluid collecting system on each surface thereof. This type of unit could be readily manifolded, using the methods suggested above, to provide apparatus according to the invention; moreover, it would have the advantage of making half the units standard and substantially independent in design from the rheological properties of the fluids being processed.

What is claimed is:
1. Apparatus for carrying out fluid-processing operations, said apparatus comprising:
 (1) a stack having a plurality of plate elements including at least a bottommost plate element; a topmost plate element; and, optionally, one or more intermediate plate elments comprising a fluid inlet side and a fluid outlet side,

(2) protective cover plates adjacent each of said bottommost plate element and said topmost plate element, (3) a hydrostatic pressure zone formed by each of said cover plates and the plate adjacent thereto, and (4) conduit means between said hydrostatic pressure zones and the more remote side of said adjacent plate element forming means whereby said hydrostatic zones are maintained at substantially equilibrium pressure with the more remote side of said adjacent plate elements.

2. Apparatus as defined in claim 1, wherein said plate element comprises a membrane and a support surface therefor.

3. Apparatus as defined in claim 2 wherein said membrane is an ultrafiltration membrane having an effective pore size of at least 10 angstroms under a 50 p.s.i.g. operating pressure.

4. Apparatus as defined in claim 1 wherein said plate elements comprise nesting means including complementary recesses and projections on units adjacent one to the other.

5. Apparatus as defined in claim 1 wherein said stack includes said plate elements comprising flow-directing means on one surface thereof and a fluid collecting system on the other surface thereof.

6. Apparatus as defined in claim 5 wherein said flow-directing means comprises a shallow spiral-like flow path.

7. Apparatus as defined in claim 1 wherein said plate elements comprise an internal conduit therein said conduit providing means for transporting liquid from one surface of said elements to the outer periphery of said stack.

8. Apparatus for carrying out fluid-processing operations, under pressure, said apparatus comprising:

(1) a stack including a plurality of nesting plate elements including at least a bottommost plate element and a topmost plate element and, optionally, one or more nesting intermediate plate elements each of which intermediate elements has a fluid inlet side and a fluid outlet side, (2) protective cover plates adjacent each of said bottommost plate element and said topmost said plate element, (3) wherein at least some said plate elements comprise a membrane defining the boundary between the fluid inlet side and fluid outlet side of said adjacent plate elements, and wherein at least one of said plate elements comprises an internal conduit for transporting liquid from one surface of said plate element to the outer periphery of the stack.

9. Apparatus as defined in claim 8 wherein said membrane is an ultrafiltration membrane having an effective pore size of at least 10 angstroms under a 50 p.s.i.g operating pressure.

10. Apparatus as defined in claim 8 wherein said stack includes said plate elements comprising flow-directing means on one surface thereof and a fluid conduit system on the other surface thereof.

11. Apparatus as defined in claim 10 wherein said flow-directing means comprises a shallow spiral-like flow path.

12. Apparatus for carrying out fluid-processing operations, under pressure, said apparatus comprising:

(1) a stack including a plurality of nesting plate elements including at least a bottommost plate element and a topmost plate element and, optionally, one or more nesting intermediate plate elements each of which intermediate elements has a fluid inlet side and a fluid outlet side, (2) protective cover plates adjacent each of said bottommost plate element and said topmost said plate element, (3) wherein at least some said plate elements comprise a membrane defining the boundary between the fluid inlet side and fluid outlet side of said adjacent plate elements, and said adjacent plate elements include portions in face to face contact with each other outside the periphery of said membrane, (4) a compressible sealing member disposed between adjacent plate elements in position to bear against said membrane near its periphery to seal said adjacent plate elements and membrane together, and (5) means for holding the nesting plate elements together in sealed relation.

13. Apparatus as defined in claim 12 wherein said plate elements comprise an internal conduit therein, said conduit providing means for transporting liquid from one surface of said processing units to the outer periphery of said stack.

14. A plate element useful for incorporation into a stack to form fluid processing apparatus, said plate element being essentially disc-like in general shape, having a fluid-directing system of conduits on one flat surface thereof, having a flow-directing means on the opposite flat surface thereof, and having an internal conduit providing means for transporting liquid from one surface of said plate element to the outer periphery thereof.

15. A processing unit as defined in claim 14 which comprises a projection on one surface thereof and a recess in the other surface thereof, said projection and recess forming nesting means whereby a stack of said processing units may be assembled.

16. Apparatus for processing fluids formed of a stack of processing units as defined in claim 15.

17. Apparatus for processing fluids formed of a stack of processing units as defined in claim 13.

18. A process for carrying out an ultrafiltration operation while maintaining the advantages of using a relatively small amount of space and relatively light weight apparatus, said process comprising the steps of (1) stacking a plurality of generally disc-shaped plate elements and membranes including at least a bottommost plate element and a topmost plate element and, optionally, one or more intermediate plate elements having a fluid inlet side and a fluid outlet side between protective cover plates, (2) maintaining a hydrostatic zone formed by each of said cover plates and the plate element adjacent thereto, (3) and maintaining fluid conduit means between each said hydrostatic zone and the opposite side of said adjacent plate element, (4) causing said hydrostatic zones to be maintained at substantially equilibrium pressure with the opposite side of said adjacent plate elements, (5) and thereby preventing deflection of said adjacent plate elements even though they be constructed of relatively low-modulus material.

References Cited

UNITED STATES PATENTS

| 3,343,681 | 9/1967 | Madden | 210—344X |
| 3,371,792 | 3/1968 | Weyand et al. | 210—343X |
| 3,398,834 | 8/1968 | Nuttall et al. | 210—321 |

FOREIGN PATENTS

| 299,299 | 7/1917 | Germany | 210—343 |

FRANK A. SPEAR, Jr., Primary Examiner

U.S. Cl. X.R.

210—321, 343, 433, 450, 456, 541